United States Patent [19]

Bernabeu

[11] Patent Number: 4,715,127

[45] Date of Patent: Dec. 29, 1987

[54] RULER FOR MEASURING ANGLES BETWEEN AN ORIENTED AXIS AND A VECTOR

[76] Inventor: Eugenio P. Bernabeu, Tramontana 16, San Just Desvern, Barcelona, Spain

[21] Appl. No.: 820,096

[22] Filed: Jan. 21, 1986

[30] Foreign Application Priority Data

Jan. 19, 1985 [ES] Spain ................................. 284.265

[51] Int. Cl.⁴ ............................................ G01B 3/02

[52] U.S. Cl. ................................... 33/494; 33/431; 33/1 C

[58] Field of Search ................. 33/494, 1 C, 483, 431

[56] References Cited

U.S. PATENT DOCUMENTS 4,271,596 6/1981 Ganis ................................. 33/494
4,446,624 5/1984 Nowell et al. ........................ 33/494
4,484,395 11/1984 Samuels ............................. 33/494
4,490,921 1/1985 Woods et al. ........................ 33/1 N

FOREIGN PATENT DOCUMENTS 687436 3/1965 Italy ..................................... 33/494

*Primary Examiner*—Willis Little
*Attorney, Agent, or Firm*—Cushman, Darby & Cushman

[57] ABSTRACT

A device for measuring angles between an oriented axis and a vector is provided in the form of a flat plate of transparent material having at least two straight parallel edges and an arrow situated on the plate and parallel with said the edges; the plate has a number of zones marked on the surface thereof and a closed curve centrally located and a longitudinal line provided parallel to the edges on either side of the central zone. Markings are provided in the zones to facilitate the measurement of the angles without requiring removal of the plate from the surface on which the angles are being measured.

6 Claims, 3 Drawing Figures

RULER FOR MEASURING ANGLES BETWEEN AN ORIENTED AXIS AND A VECTOR

DESCRIPTION

The device is a ruler for measuring angles between an oriented axis and a vector consisting of an essentially flat plate, made almost entirely from transparent material. Its form or perimeter is principally delimited by two straight parallel segments to be called: EDGES.

Figure 1:
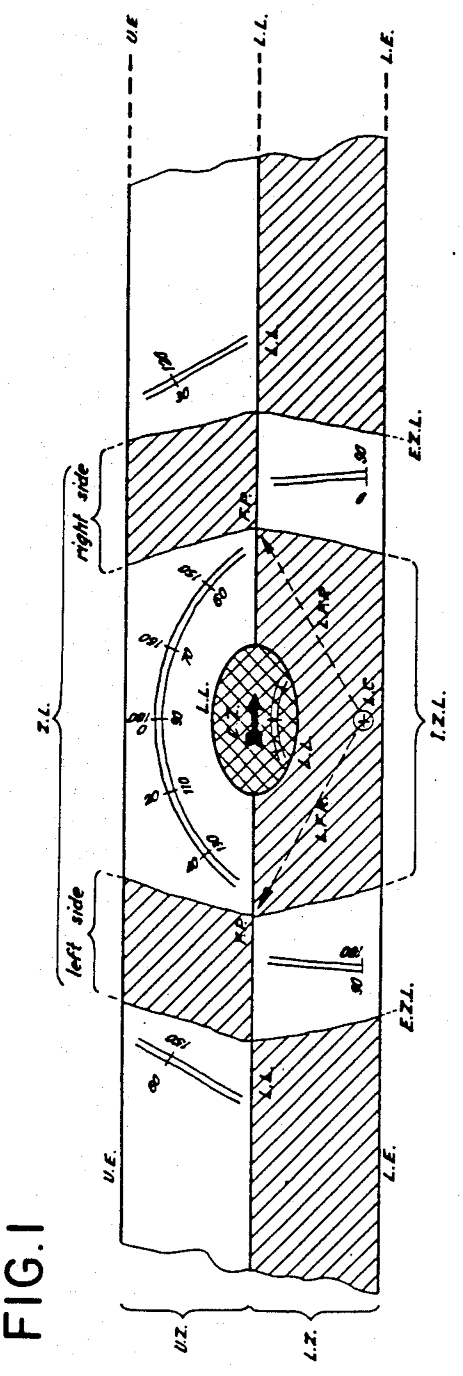
Figure 2:
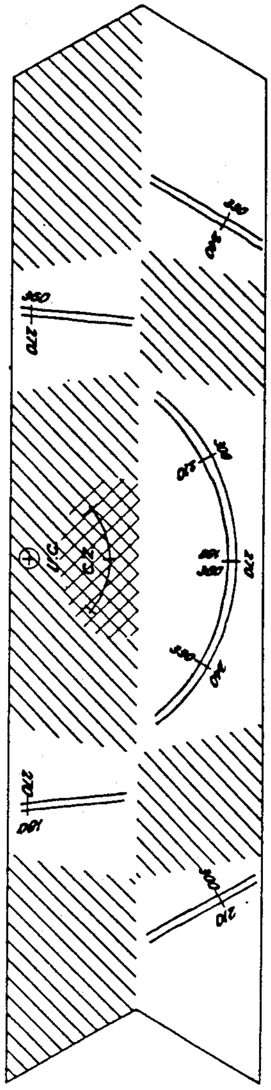
Figure 3:
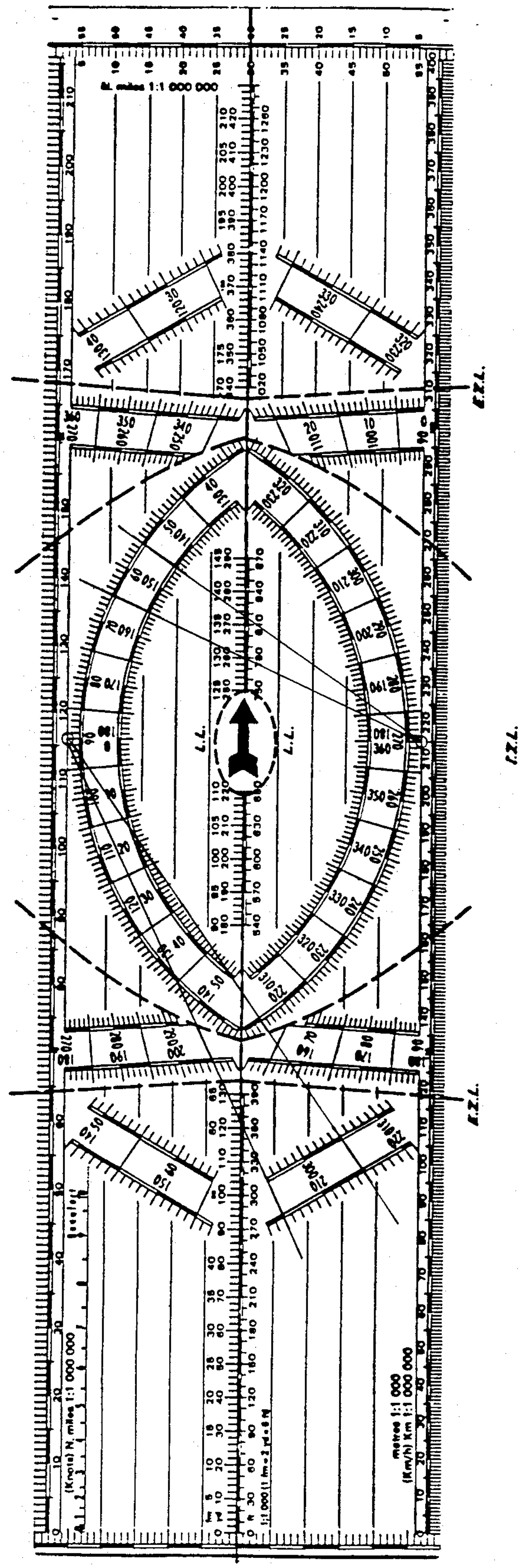

Positioning the device such that the surface lies horizontal and so that the edges run left to right from the observer's point of view, we will call the edge nearer the observer the LOWER EDGE (abbreviation, L.E.) and the further one the UPPER EDGE (U.E.). FIGS. 1, 2 and 3 show various features of the device. The edges marked L.E. and U.E. are to be parallel in all cases.

A symbol, to be called the ARROW (A) will be located at some point on the surface, to indicate the orientation of the edges and the direction towards the observer's right, mentioned in the previous paragraph. In FIGS. 1 and 3 the representation of an arrow has been situated in the centre of the item; in FIG. 2, the perimeter of the item forms the direction symbol.

The LONGITUDINAL LINE (L.L.) is the line which, from the observer's point of view as indicated above, consists in the central section of a closed curve and in the outer sections of straight lines on at the right and left, approximately parallel with the edges and equidistant from them. This longitudinal line is represented in FIGS. 1 and 3 with reference L.L.

The part of the surface defined by the longitudinal line (L.L.) and the upper edge (U.E.) will be called the UPPER ZONE or AREA (U.Z.); the part defined by the Longitudinal Line (L.L.) and the Lower Edge (L.E.) will be called the LOWER ZONE (L.Z.). The zone or area defined by the closed curve of the longitudinal line (L.L.) will be called the COMMON ZONE or AREA (C.Z.), belonging as it does equally to the upper and lower zones. These upper and lower zones (U.Z. and L.Z.) and the common zone (C.Z.) are represented in FIG. 1, the latter by cross-hatching.

The ZONAL LINES (Z.L.) are the four lines, not necessarily straight, which do not cross each other, all cutting both edges and the longitudinal line (L.L.).

With regard to the four zonal lines as seen by an observer as described in previous paragraph, and with regard to their relative positions, let it be established that two of them are situated on the LEFT SIDE and the other two on the RIGHT SIDE; let it further be established that two of them are EXTERIOR (E.Z.L.'s) and the others are INTERIOR (I.Z.L.'s). The four zonal lines (Z.L.) will be found indicated in FIG. 1, differentiated according to whether they are on the LEFT side or the RIGHT, EXTERIOR (E.Z.L.) or INTERIOR (I.Z.L.).

It is to be emphasized that the common zone (C.Z.), delimited by the closed curve of the longitudinal line (L.L.), will always be situated between the two internal zonal lines (I.Z.L.). This situation may be seen in FIG. 1.

The points where the interior zonal lines (I.Z.L.) cut the longitudinal line (L.L.) will be called the FRONTIER POINTS (F.P.). These two points are indicated on FIG. 1.

In the LOWER ZONE or area of the device (L.Z.), defined by the longitudinal line (L.L.) and the two interior zonal lines (I.Z.L.) we will position a point which we will call the LOWER CENTRE (L.C.) and the vectors originating at this point (L.C.) and terminating at the FRONTIER POINTS (F.P.) will be called LOWER CENTRE FRONTIER RADII—(L.F.R.). In the UPPER ZONE or area of the device and within the limits mentioned above, we will position a point which we will call the UPPER CENTRE (U.C.) and the vectors originating at this point (U.C.) and terminating at the frontier—points (F.P.) will be called UPPER CENTRE FRONTIER RADII (U.F.R.). In FIG. 1 will be found indicated the lower centre (L.C.) with its two frontier radii (L.F.R.); in FIG. 2 will be found indicated the upper centre (U.C.).

With regard to the use of the device as a ruler for measuring angles, let it be established that the two above mentioned points, U.C. and L.C. are centres of groups of radii whose amplitudes so established are arranged such that each is equal to or greater than 180° sexagesimal degrees.

With regard to the method of representing the graduations of the above-mentioned radial lines, this consists of a partial representation of the radii in sexagesimal degrees of the amplitude adopted for each field of angles, but only within the areas or zones which permit a partial representation as a group of angles, and such that a partial representation of each radius occurs in at least one area or zone.

Concerning the definition of the various areas or zones and of the group or groups of radii which may be partially represented in each of them, we establish the following:

- in the UPPER area or zone of the device (U.Z.), defined by the LONGITUDINAL LINE (L.L.) and the two INTERIOR ZONAL LINES (I.Z.L.), only those radii originating from the LOWER CENTRE (L.C.) and bounded by the two FRONTIER RADII (I.F.R.) may be partially represented.
- in the LOWER zone or area (L.Z.), with the same limits as above, only those radii originating from the UPPER CENTRE (U.C.) and bounded by the FRONTIER RADII may be partially represented.
- in the two LOWER zones or areas (L.Z.) bounded by the LONGITUDINAL LINE (L.L.) and the two ZONAL LINES on the same side, only those radii originating from the LOWER CENTRE (L.C.) and whose angle is such that they may appear there may be partially represented.
- in the two UPPER zones or areas (U.Z.) with the same limits as those above, only those radii originating from the UPPER CENTRE (U.C.) and whose angle is such that they may appear there may be partially represented.
- in the remaining two UPPER zones or areas (U.Z.) those radii originating from the LOWER CENTRE (L.C.) and whose angle is such that they may appear there may be partially represented.
- in the remaining two LOWER zones or areas (L.Z.) all the radii originating from the UPPER CENTRE (U.C.) and whose angle is such that they may appear there may be partially represented.

We have defined with the above, five zones or areas which permit the partial representation of radii of the group originating from the lower centre (L.C.), another five zones or areas which only permit the partial representation of radii of the group originating from the upper centre (U.C.) and the COMMON zone or area (C.Z.) which permits the partial representation of radii of both groups. In FIG. 1, the five hatched zones or areas are those permitting the partial representation of radii of the group originating from the upper centre (U.C.), the cross-hatched areas is the common zone, permitting the partial representation of radii of both groups and the five zones or areas without hatching are those which permit the partial representation of radii of the group originating from the lower centre (L.C.), some of which are partially represented in FIG. 1. In FIG. 2, on the other hand, some of the radii of the group originating from the upper centre (U.C.) have been partially represented in the areas or zones where this is possible, i.e., in the common zone (C.Z.) and in the unhatched areas or zones.

With regard to the evaluation of the angle of each radius and, therefore, the definition of the radius of origin and the direction of positive increments, the following is established as a possible realization:

the radius of origin is taken to be that originating from the LOWER CENTRE (L.C.) lying to the right of the latter and parallel with the edges: its evaluation is 0° (or 360° if it is taken to be the last radius of the circle).

the direction of positive increment is anticlockwise, therefore the 90° radius will be that originating from the LOWER CENTRE (L.C.) and perpendicular to the UPPER EDGE (U.E.).

From the above we conclude that the group of angles originating from the LOWER CENTRE (L.C.) contains all the radii between 0° and 180°, it being possible that it could also contain the values immediately below 360° and immediately above 180°. In FIG. 1, with numbers incidentally situated between the lower centre (L.C.) and the partial representation of each radius, will be found indicated the values 0°, 30°, 60°, 70°, 90°, 110°, 130°, 150° and 180°; the meaning of the other numbers which appear together with these values will be explained below.

With regard to the bunch of radii originating from the UPPER CENTRE (U.C.), the 180° valued radius is that lying to the left and parallel with the edges, the 270° valued radius is the one perpendicular to the LOWER EDGE (L.E.) and the 360° valued radius is that lying to the right and parallel with the EDGES (which may also be valued as 0°). Therefore, this field of angles contains all the radii between 180° and 360°, and may further contain those immediately below 180° and those immediately above 0°.

In FIG. 2, where the numbers in this example incidentally appear further from the Upper Centre (U.C.) than the partial representation of each radius, these partial representations of the radii are indicated for the values 180°, 210°, 240°, 270°, 300°, 330° and 360°.

Taking as significant radii those whose values correspond to multiples of 10, the numbers which specify them will be written such that the corresponding radius lies centred on the numbers and perpendicular to their horizontal axis, the lower part of the numbers being closest to their corresponding centre (U.C. or L.C.). These numbers will be called BASIC numbers and examples of them are those specified in the two preceding paragraphs.

Close to such BASIC numbers and referring to the same radii there are to be written other numbers, which we will call INCLINED numbers which are the result of the addition or substraction of 90 from the basic numbers and written perpendicularly to the latter by being rotated 90° to the right (clockwise) or to the left (anticlockwise) in accordance with the following:

for BASIC values between 0° and 90°, as well as between 180° and 270°, add 90 and rotate to the left.

for BASIC values between 90° and 180° as well as between 270° and 360°, substract 90 and rotate to the right.

In FIGS. 1, 2 and 3, together with the above-mentioned BASIC numbers, there appear the corresponding INCLINED numbers with their appropriate value and 90° rotation. The relative position of each pair of numbers may vary; all the BASIC numbers may appear between the INCLINED numbers and the corresponding centre of each field of angles, as in FIG. 1; or it may be the INCLINED numbers which appear between the BASIC numbers and the corresponding centre of each field of angles, as in FIGS. 2 and 3.

To facilitate the reading of the numerals and the identification of the radii, the significant radii and intermediate radii are to be emphasized by differences of length and/or thickness of line; similarly the partial representations of the radii are to be cut by curves or straight lines, thus forming what will be called the CALIBRATION OF THE RULE.

Similarly, in order to facilitate use, the possibility is established that the symbols and/or zones or areas corresponding to each field of angles be coloured. For example, those parts corresponding to the LOWER CENTRE field of angles could be coloured green-blue and those corresponding to the UPPER CENTRE in pink-red, or both in yellow.

The foregoing completely defines the device, which is partially represented in FIG. 1, with reference to which the following points are to be emphasized:

indicated with thick continuous lines are the L.L. which includes the closed curve containing the common zone (C.Z.) and the perimeter of the rule which includes the two edges (L.E. and U.E.).

indicated in continuous fine lines are the four zonal lines (Z.L.) prolonged beyond the ruler in broken lines, the two left-hand zonal lines and the two right-hand zonal lines being specifically indicated by braces, and the two interior zonal lines (I.Z.L.) being also additionally indicated by one brace.

indicated with thin broken lines are the two lower centre frontier radii (L.F.R.) lying between the above-mentioned lower centre (L.C.) and the frontier points (F.P.) as described beforehand.

indicated with hatching are the zones or areas within which is only possible the partial representation of the field of angles of radii corresponding to the upper centre (U.C.), not represented in FIG. 1.

indicated by cross-hatching is the COMMON zone or area (C.Z.) where radii of both field of angles may be partially represented, although in FIG. 1 only certain significant radii originating in the Lower centre (L.C.) have been partially represented.

the arrow symbol (A.) is shown; in this example it has benn situated within the COMMON zone or area (C.Z.).

the partial representations of certain significant radii of the field of angles originating from the lower centre (L.C.) are also indicated, with BASIC numbers situated between the field of angles centre (L.C.) and the INCLINED numbers. These partial representations of the radii cut curves or straight lines, as indicated in FIG. 1 in fine lines in order to facilitate reading and identification and forming the calibration of the rule.

FIG. 2 is a partial sketch of fields of angles originating from the upper centre (U.C.); the following points are to be emphasized:

neither the longitudinal line nor the zonal lines have been represented, but the zones or areas which only permit the representation of the field of angles originating from the Lower centre (L.C.) have been hatched, and the common zone or area (C.Z.) has been cross-hatched.

the INCLINED numbers have been placed between the centre of the field of angles (U.C.) and the BASIC numbers.

the perimeter of the rule indicates the orientation, thus performing the function of the ARROW symbol; the addition of an inscribed ARROW (A) symbol is therefore unnecessary.

FIG. 3 represents a version of the ruler conforming to the characteristics of the present device, conforming as it does to the necessary and sufficient conditions for this, since:

tracing the broken lines and thick lines as indicated which give instances of the longitudinal line (L.L.) and the zonal lines (Z.L.), the ten areas or zones permitting the partial representation of the radii of one or the other fields of angles are shown, as well as the common zone or area (C.Z.) which permits the partial representation of radii of both fields of angles.

the partial representations of the radii of each field of angles occurs only in the zones or areas permitting such representation, as specified in the claims for the present device.

FIG. 3 indeed represents a version of the ruler falling within the characteristics of the present device, in spite of the following peculiarities:

no radii are represented within the COMMON zone or area, this being due to the fact that the closed curve of the longitudinal line (L.L.) may permissibly be reduced to a point.

numerous extra scales are shown around the perimeter and along the axis parallel to the edges, as well as various straight segments parallel to the EDGES, but none of the foregoing prevents the version of the ruler represented here conforming to the above-mentioned necessary and sufficient conditions such that it remains within the characteristics of the present device.

It is to be emphasized that in the commercial versions of the ruler, neither the lines defining the zones or areas, nor the longitudinal line (L.L.) nor the frontier radii (L.F.L., R.F.L.) will normally be represented.

Given the information in the present description, illustrated with three Figures, the device is seen to be a ruler which facilitates the measurement of angles in a plane defined by the rectangular Cartesian co-ordinate axis in which the ordinate axis "y" is taken as the origin of angles from 0° to 360° sexagesimal degrees clockwise.

Placing the device or ruler in whatever position on the above-mentioned plane, its Arrow and its Edges being considered in the same direction, will form with the positive ordinate half-axis, an angle which will be called R. In this position and taking the fields of angles of radii corresponding to the appropriate centre, the radius parallel to the ordinate axis will have precisely the value R mentioned above, and reading will be simplified by the fact that the BASIC numbers indicating this value will be perpendicular, or nearly so, to the above radius (with deviation of less than 10°) and have their base nearest to its centre. Furthermore, and considering the radius perpendicular to the ordinate axis there will correspond a value 90° away from R. Taking also the numbers of the INCLINED numeration, to this radius there will also correspond the number R, and the reading of this will have the same advantage of simplicity as for the BASIC numbers.

From the above we may deduce the practical method of obtaining the angle R which a vector forms with an oriented axis:

take the above-mentioned axis as the ordinate.

position the ruler such that the ARROW (A) is parallel to the vector and in the same direction.

maintaining the parallelism, we move the ruler until the appropriate radial centre falls over a line parallel or perpendicular to the ordinate axis; such a line will mark on the calibration of the ruler the value R, reading the BASIC number when the line is parallel to the ordinate axis or with the INCLINED number when perpendicular. The numbers indicating this value will possess the simplicity of reading mentioned above.

The device may, in its essentials, be realized in other forms differing in details from the one exemplified in the description, and such forms will also qualify for the protection claimed.

It may, therefore, be manufactured in any shape and size, from any materials that may prove suitable such that the whole remains within the spirit of the following claims.

What is claimed is:

1. A ruler for measuring angles increasing in a clockwise direction between 0° and 360° between an oriented axis and a vector, comprising an essentially flat and transparent body including, in combination;

a perimeter including two edges parallel with each other;

an arrow situated on a part of said body and parallel with said edges;

a surface on said ruler subdivided into eleven zones separated from each other by five lines, including a longitudinal line and four zonal lines, said longitudinal line being a straight line parallel with and equidistant from said edges, said longitudinal line being interrupted at its central part, where a closed curve is provided; said zonal lines each reaching from one of the said edges to the other without crossing each other, two of said zonal lines being on one side of said closed curve and the other two being on the other side of said closed curve.

2. The combination claimed in claim 1 further comprising two center points including a lower center point and an upper center point, each being contained in one of the two zones of said surface contiguous with the mid point of one of said respective edges: the said lower center point being the center point situated in a lower zone of said surface when said ruler is situated so that said arrow points toward the observer's right, and the said upper center point being the center situated in an upper zone of said surface when said ruler is located so that said arrow points towards the observer's right.

3. The combination claimed in claim 2 further comprising twelve groups of angular markings on said surface, six of said groups of angular markings with their origin at said lower center point, and the other six with their origin at said upper center point, said twelve groups of angular markings being situated in the said eleven zones as follows:

the six groups of angular markings with origin at said lower center point being situated in the following six zones: one group within a common zone, being the zone enclosed by said closed curve, another group within the zone containing said upper center point, two groups each situated in one of the two zones contiguous with the one containing said lower center point and the two remaining groups each being situated in one of the two zones farthest from said lower center point;

the six groups of angular markings with origin at said upper center point being situated in the following six zones: one group within said common zone, and the other five groups each being situated in one of the five of said zones not containing said angular markings with origin at said lower center point.

4. The combination as claimed in claim 3 wherein said six groups of angular markings with origin in said lower center point and also for each of the six groups of angular markings with origin in said upper center point include a first set of angular markings extending from zero through one hundred and eighty for said markings with origin at said lower center point and a second set of markings extending from one hundred and eighty through three hundred and sixty for said six groups of markings with origin at said upper center point, each of said numbers of said sets being in correspondence with one of said angular markings and oriented such that it can be read upright from said origin of the corresponding center point with the angular value increasing in a selected direction;

a third set of markings and corresponding numbers, said markings being correlated to the markings of said first and second sets of markings with the orientation of said numbers of said third set being inclined relative to said orientation of said first and second markings through an angle of approximately 90° in a selected direction.

5. A method for measuring angles increasing clockwise from 0° to 360° between an oriented axis and a vector utilizing a ruler including an essentially flat and transparent body having, in combination, a perimeter including two edges parallel with each other;

an arrow situated on a part of said body and parallel with said edges;

a surface on said ruler subdivided into eleven zones separated from each other by five lines, including a longitudinal line and four zonal lines, said longitudinal line being a straight line parallel with and equidistant from said edges, said longitudinal line being interrupted as its central part, where a closed curve is provided; said zonal lines each reaching from one of the said edges to the other without crossing each other, two of said zonal lines being on one side of said closed curve and the other two being on the other side of said closed curve, said body further including two center points including a lower center point and an upper center point, each being contained in one of the two zones of said surface contiguous with the mid point of one of said respective edges, with said lower center point being the center point situated in a lower zone of said surface when said ruler is situated so that said arrow points towards the observer's right, and the upper center point being the center situated in an upper zone of said surface when said ruler is located so that said arrow points towards the observer's right, the steps comprising:

defining on a plane surface the said oriented axis and the said vector and establishing as north of said plane the direction indicated by said oriented axis,. and establishing as south of said plane the direction opposite to that indicated by said oriented axis;

situating said ruler on said plane in such a manner that said arrow lies parallel with said vector and that both said arrow and said vector point in the same direction;

observing said ruler thus situated and, choosing between said upper center point and said lower center point with the center point to be used the one lying further south on said plane;

moving the said ruler in such a way that, maintaining said arrow and said vector parallel, the said center point to be used lies on the line to be used, which is one of the lines of the said oriented axis or a line perpendicular to said oriented axis;

observing the place where said line to be used coincides with the numbered angular markings on said ruler corresponding to the said center point to be used; the value of the angle between the said oriented axis and the said vector being given by the angular marking with reference to only the number with its upper part towards the north of said plane, with a deviation equal to or less than 10° when the said basic numeration increases in increments of 10°.

6. A method of measuring an angle between an oriented axis and a vector on a substantially flat surface with a device of the type having a substantially flat body, said body including first and second space, parallel edges and indicia including a longitudinal line extending parallel to said edges and a vector arrow being co-incident with a selected portion of said longitudinal line, and at least one area having a plurality of radial lines each extending at a designated angle, said method comprising the steps of:

defining on said surface an ordinate axis, placing said body on said surface so that said arrow is parallel to the vector and pointing in the same direction as the vector, moving the body while maintaining said arrow parallel with said vector until said one area overlies a line extending parallel or perpendicular to the ordinate axis whereby one of said radial lines will indicate the desired angular reading.

* * * * *